US007900837B2

(12) United States Patent
Sinclair et al.

(10) Patent No.: US 7,900,837 B2
(45) Date of Patent: Mar. 8, 2011

(54) OPTICAL FIBER PAPER READER

(75) Inventors: Michael J. Sinclair, Kirkland, WA (US);
Yuqun Chen, Seattle, WA (US);
Behrooz Chitsaz, Bellevue, WA (US)

(73) Assignee: Microsoft Corporation

( * ) Notice: Subject to any disclaimer, the term of this patent is extended or adjusted under 35 U.S.C. 154(b) by 1028 days.

(21) Appl. No.: 11/685,920

(22) Filed: Mar. 14, 2007

(65) Prior Publication Data

US 2008/0226297 A1 Sep. 18, 2008

(51) Int. Cl.
*G06K 7/10* (2006.01)
(52) U.S. Cl. .............................. 235/462.01; 235/462.25
(58) Field of Classification Search ............. 235/462.01, 235/462.08–462.1, 462.25
See application file for complete search history.

(56) References Cited

U.S. PATENT DOCUMENTS

| | | | |
|---|---|---|---|
| 3,922,090 A | 11/1975 | Fain | |
| 4,099,208 A | 7/1978 | Tasaku et al. | |
| 4,524,276 A | 6/1985 | Ohtombe | |
| 4,682,794 A | 7/1987 | Margolin | |
| 5,399,874 A | 3/1995 | Gonsalves et al. | |
| 5,719,939 A | 2/1998 | Tel | |
| 5,959,289 A | 9/1999 | Okada et al. | |
| 5,974,150 A * | 10/1999 | Kaish et al. | 713/179 |
| 6,304,713 B1 | 10/2001 | Isogai et al. | |
| 7,089,420 B1 * | 8/2006 | Durst et al. | 713/176 |
| 7,497,379 B2 * | 3/2009 | Chen et al. | 235/454 |
| 2005/0178841 A1 | 8/2005 | Jones et al. | |
| 2005/0190914 A1 | 9/2005 | Chen et al. | |

OTHER PUBLICATIONS

Chen, et al., "Certifying Authenticity via Fiber-Infused Paper", available at least as early as Jan. 19, 2007, at <<http://delivery.acm.org/10.1145/1130000/1120685/p29-chen.pdf?key1=1120685&key2=1288909611&coll=GUIDE&dl=GUIDE&CFID=9328644&CFTOKEN=95450360>>, ACM SlGecom Exchanges, Apr. 2005, vol. 5, No. 3, pp. 29-37.

"Counterfeit-Resistant Optical Fiber", available at least as early as Jan. 19, 2007, at <<http://download.microsoft.com/download/d/6/b/d6bde980-5568-4926-8c71-dea63befed64/anti_counterfeit.doc>>, Microsoft Corporation, 2005, pp. 1-8.

Kirovski, "Toward an Automated Verification of Certificates of Authenticity", available at least as early as Jan. 19, 2007, at <<http://delivery.acm.org/10.1145/990000/988797/p160-kirovski.pdf?key1=988797&key2=1149909611&coll=GUIDE&dl=GUIDE&CFID=9329241&CFTOKEN=62389404>>, ACM, 2004, pp. 160-169.

* cited by examiner

*Primary Examiner* — Daniel St.Cyr
(74) *Attorney, Agent, or Firm* — Lee & Hayes, PLLC

(57) ABSTRACT

Techniques for authenticating certificates of authenticity (COAs) are discussed. The techniques provide for a simplified authentication system that is easily utilized in a field setting. In described embodiments, COAs are attached to or otherwise associated with goods to be authenticated. The COAs incorporate random or pseudo-random arrangements of optically sensitive fibers to create unique identifiers. A COA reader device optically scans each COA and characterizes the COA according to its unique arrangement of optical activity. A COA reader device may also scan data (e.g., a barcode) that is associated with the COA. The data contains information about the COA to further strengthen the COA authentication process. Based on the scan, the goods associated with the COAs can be verified as genuine (i.e., not pirated).

20 Claims, 13 Drawing Sheets

OPTICAL FIBER PAPER READER

BACKGROUND

Techniques that seek to counterfeit, forge or otherwise fraudulently produce many types of products constantly increase in their sophistication and accuracy. As a result, there is a need for authentication systems and methods that are economically feasible and relatively simply to implement by legitimate manufacturers, but that also create a significant cost barrier to potential pirates.

Many current systems utilize labels or other physical marking methods that employ machine-readable codes in a visual format (e.g., a barcode) or other distinguishing physical characteristics (e.g., holograms) to identify an item as being genuine. However, most of these methods utilize markings that are not unique to each product. Accordingly, if a pirate manages to duplicate a legitimate product marking, the pirate may mark multiple counterfeit products with a single duplicated marking and thus give the counterfeit products the appearance of being genuine.

Other product marking systems have managed to create fairly unique product marking codes such that individual goods may be marked with significantly unique indicia of authenticity. Some of these systems use a certificate of authenticity (COA) to mark each genuine product. Each product may later be authenticated by examining the COA to determine if the COA is genuine or has been counterfeited by a pirate. However, most of these systems require sophisticated authentication or verification tools that are difficult or impossible to utilize in a field setting such as a warehouse, retail store, or the hold of a ship.

SUMMARY

Techniques for authenticating certificates of authenticity (COAs) are discussed. The techniques provide for a simplified authentication system that is easily utilized in a field setting. More specifically, in one embodiment, a device optically scans COAs that are attached to or otherwise associated with products for the purpose of authenticating that the associated products are genuine (i.e., not pirated). Still further, authentication methods are discussed that may implement such devices.

In some embodiments, COAs incorporate random or pseudo-random arrangements of optically sensitive fibers to create a unique identifier for each COA. A COA reader device scans the COAs and characterizes each COA according to its unique arrangement of optical activity. A COA reader device may also scan data displayed in a visual format (e.g., a barcode) that is associated with the COA. The data displayed in a visual format contains information about the COA and is cryptographically secure to further strengthen the COA authentication process.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

The following disclosure describes techniques for authenticating certificates of authenticity (COAs). As used herein, the terms "authenticate" and "authentication" refer to acts involved in determining if a COA and/or its associated product are genuine or counterfeit. Thus, the act of authentication may result in the determination that a COA and/or its associated product are genuine, or that they are counterfeit.

The techniques described herein provide for a simplified authentication system that is easily utilized in a field setting. A handheld or portable device may be used to optically scan COAs that are attached to or otherwise associated with goods for purposes of authenticating that the associated goods are genuine (i.e., not pirated). Still further, authentication methods are discussed that may implement such devices. For the purposes of this discussion, the term "pirate" refers to any individual or entity that seeks to counterfeit or otherwise fraudulently produce goods or products.

As described herein, the disclosed COAs are in the form of counterfeit-resistant labels that are applied to or otherwise incorporated into goods or products that a manufacturer may wish to authenticate. Examples of such goods or products include, but are not limited to, software, video media, audio media, pharmaceuticals, artwork, bank notes, cashier's checks, welfare vouchers and the like. The labels contain a random pattern of physical features that are either naturally inherent or are intentionally embedded. Examples of such physical features include the random or pseudo-random distribution of light-conducting fibers, such as fiber optic strands. The pattern of these features is unique to each label and may not be exactly duplicated by a pirate at a reasonable cost. Information about this significantly unique pattern is cryptographically signed and either printed on the label, stored in an accompanying readable device such as a smart chip or other storage media, or provided remotely (e.g., through a remote server or database).

When authenticating such a label, the physical pattern is scanned and evaluated as to whether it matches the signed information. Public-key cryptography permits verification of the signed information using a public key without revealing the corresponding private secret key that is used for signing.

Exemplary Architecture

Figure 1:
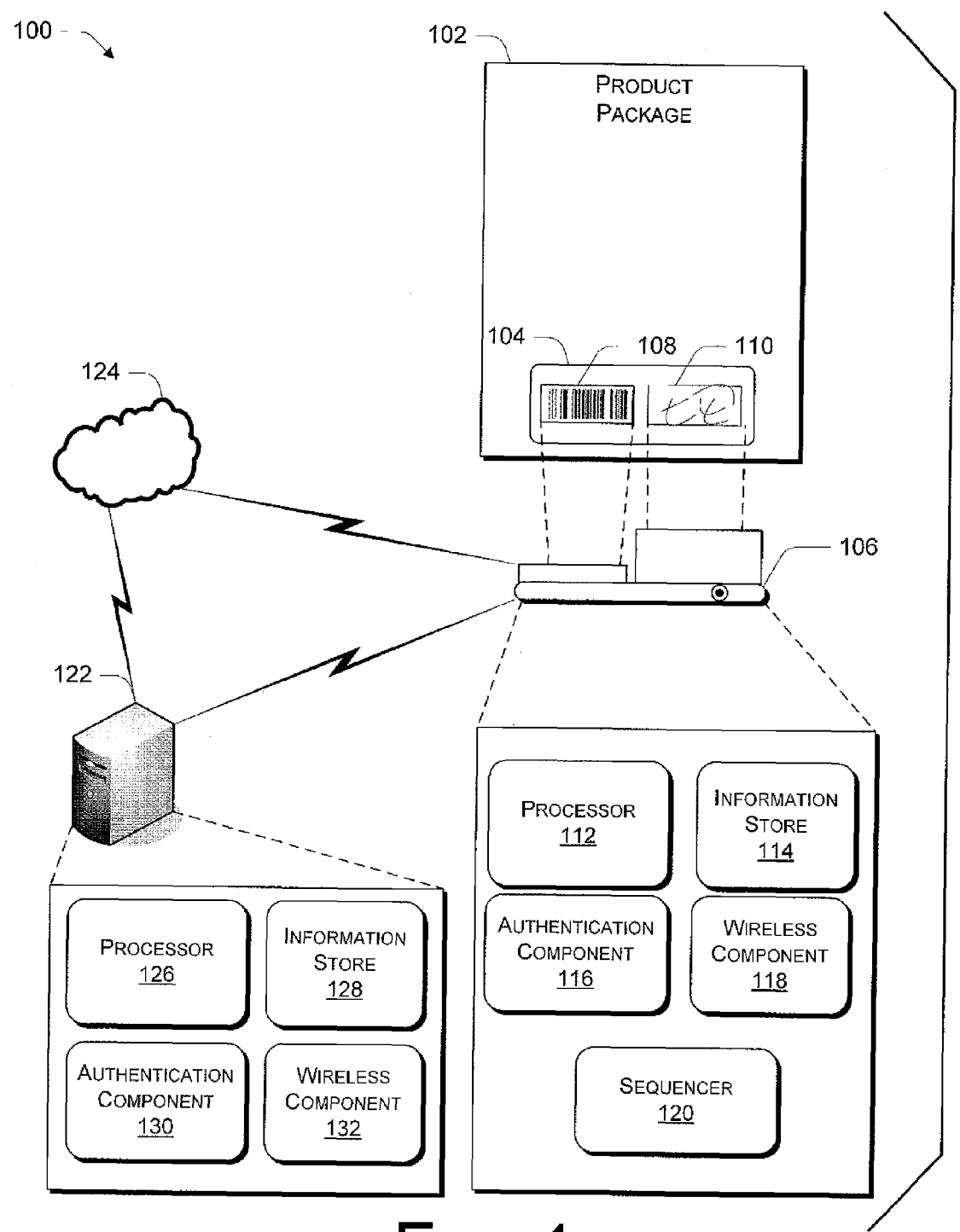
FIG. 1 illustrates an exemplary architecture for implementing techniques to authenticate a certificate of authenticity (COA).

FIG. 1 illustrates an authentication architecture 100 in which the devices and methods discussed herein may be implemented. Authentication architecture 100 is presented for purposes of illustration only, and other suitable architectures may utilize the discussed devices and methods without departing from the spirit and scope of the claimed embodiments. Authentication architecture 100 includes product package 102, certificate of authenticity (COA) 104 associated with the product package, and COA reader device 106. COA 104 includes barcode 108 and optical fiber area 110.

In operation, the manufacturer of product package 102 (and/or the product therein) affixes or otherwise incorporates COA 104 into the product package. COA 104 may be in the form of an adhesive label that is affixed to the product package, or it may be constructed as part of the product package itself. Once a product is packaged into product package 102, the package may be distributed to a wholesaler, retailer, or some other suitable destination or entity. At any point in its journey, one or more entities may wish to authenticate the product within product package 102 by evaluating COA 104. This may be done using COA reader device 106. An entity in possession of COA reader device 106 may scan COA 104 by placing the reader over the COA and activating the reader's scan function.

In some embodiments, COA reader device 106 includes internal computing, communication and data storage components such as processor 112, information store 114, authentication component 116, wireless component 118 and sequencer 120. These components are interconnected to allow for communication among the components. Processor 112 can process data obtained during a COA scan to authenticate a COA. Information store 114 may include one or more computer-readable memories and can store a database of COAs that may later be referenced during a COA scan. Authentication component 116 can be implemented during a COA scan to authenticate a COA. In some implementations, utilizing authentication component 116 may include using processor 112 to process data obtained during the COA scan, and then accessing a database of COAs stored in information store 114. Sequencer 120 may be used in implementations that utilize light source sequencing in the COA authentication process. Wireless component 118 may be utilized to access remote resources such as a network or a remote server.

Using these components, the COA reader device may perform on-location authentication processes and make a determination as to the authenticity of a product. Thus, in one implementation, when an entity in possession of a COA reader device scans a COA, the reader device processes information obtained from the COA and produces feedback to the entity concerning the authenticity of the product. This processing may include using the authentication component to obtain data associated with COAs and authenticate the COA using information obtained from the reader device information store.

Optionally, COA reader device 106 may be connected to a remote storage and computational resource such as remote server 122, either directly or via network 124. Remote server 122 includes processor 126, information store 128 (such as a computer-readable memory), authentication component 130 and wireless component 132. Connection by COA reader device 106 to a remote resource may be made using wireless component 118 and via wireless technologies such as WiFi, Bluetooth, cellular, satellite, and the like. Additionally or alternatively, COA reader device 106 may include a wire connection component (not expressly shown in FIG. 1) that may implement wire technologies such as LAN, WAN, cable, and the like. In these embodiments, COA reader device 106 scans COA 104 and transmits the raw or partially processed COA data to remote server 122. The remote server may then process the COA data and compare the processed data with a known database of COAs to evaluate product authenticity. This processing may include using the authentication component to obtain data associated with COAs and authenticate the COA using information obtained from the remote resource information store. Authentication architecture 100 is presented for overview purposes, and components in the architecture will be discussed in greater detail below.

Certificate of Authenticity

Figure 2:
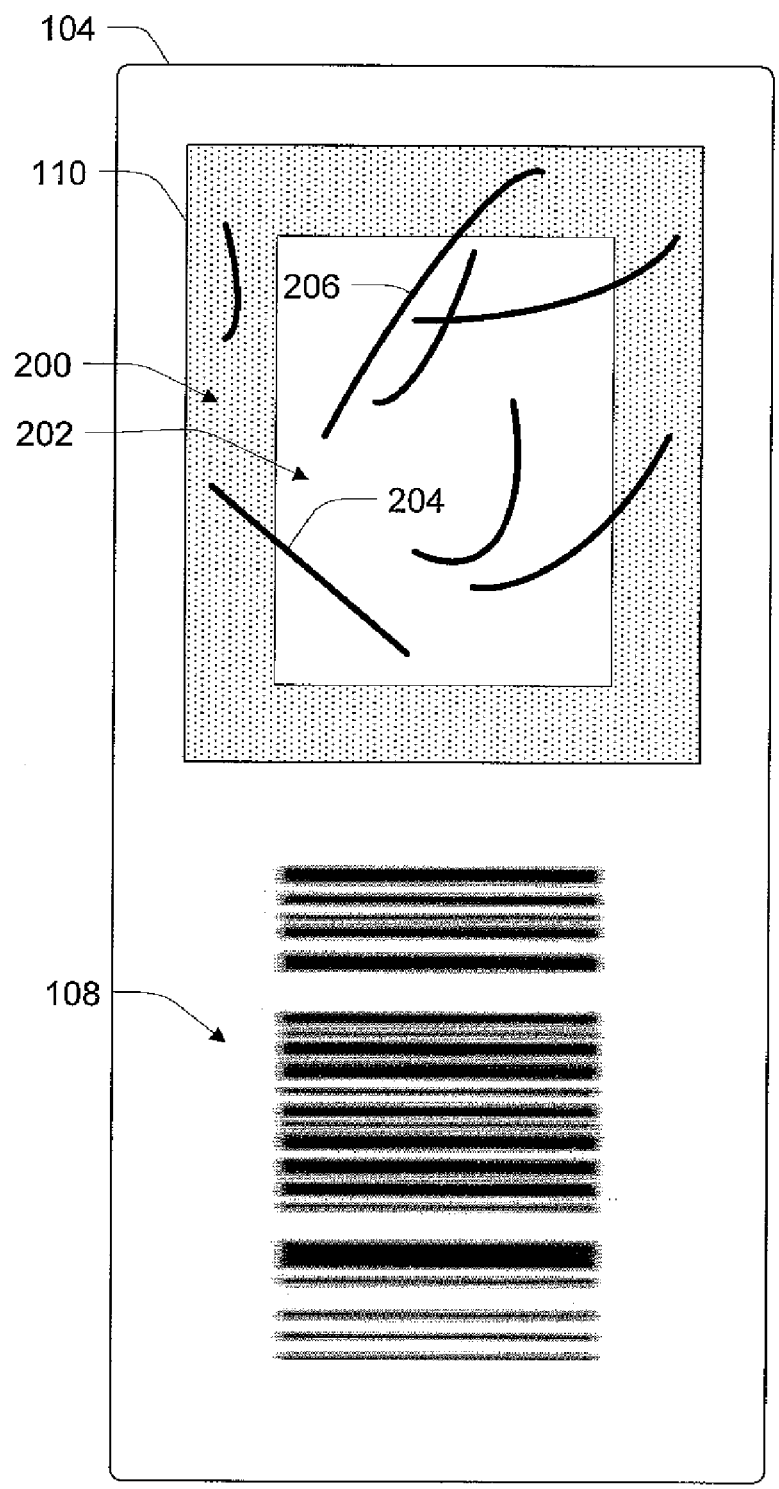
FIG. 2 illustrates an exemplary certificate of authenticity.

FIG. 2 shows COA 104 in more detail. COA 104 includes barcode 108 and COA optical fiber area 110 disposed adjacent to one another. In some embodiments, COA reading devices (such as COA reader device 106 illustrated in FIG. 1) are designed to illuminate only certain parts of a COA optical fiber area while shielding other parts of the COA optical fiber area from any direct light. Thus, as illustrated in FIG. 2, COA optical fiber area 110 includes an illumination region 200 around its periphery that can be illuminated by a light source. Although illumination region 200 is visibly distinct in this figure, this is not intended to be limiting, and other illumination regions may not be visibly distinguishable from the remainder of a COA. COA optical fiber area 110 also includes a fiber scanning region 202 which can be shielded by a COA reading device so as to minimize any direct light incident upon its surface.

Interspersed throughout COA optical fiber area 110 are optical fibers 204 and 206. To provide for varying features (e.g., while illuminated), the optical fiber strands may have different lengths, thicknesses, colors, and the like. In some embodiments, the optical fiber strands may be cut, mixed, and embedded into optical fiber area 110. For example, different types of fiber optic strands (e.g., having different thicknesses, colors, fluorescence, and the like) may be cut at different lengths and thrown in a bin to be mixed. The mixed fiber optic strands may then be sprayed with a transparent and protective substance (e.g., with clear glue or a resin such as an epoxy resin) onto a medium to form randomly-embedded optical fibers on the medium. The transparent and protective substance is envisioned to limit movement of the fibers to ensure that the label maintains its randomly occurring features. The medium may be precut or cut after the embedding stage and then affixed to a product package. Any suitable medium may be utilized, such as paper, plastic, fabric, and the like. In other embodiments, the optical fibers may be incorporated into the product packaging material itself.

Finally, COA 104 includes barcode 108 that can be scanned to discern information about a product associated with the COA. In some embodiments, barcode 108 includes information about optical fiber area 110, such as the coordinates of the optical fiber endpoints. The information in barcode 108 may be encrypted such that the barcode presents a secure representation of product-related information, including information about the optical fiber area. This embodiment uses a barcode for purposes of illustration only, and other means and formats for representing information may be utilized, visually or otherwise. Other suitable examples include, but are not limited to, one dimensional barcodes, two dimensional barcodes, stacked barcodes, and smart tag technologies including radio frequency identification (RFID).

Figure 3:
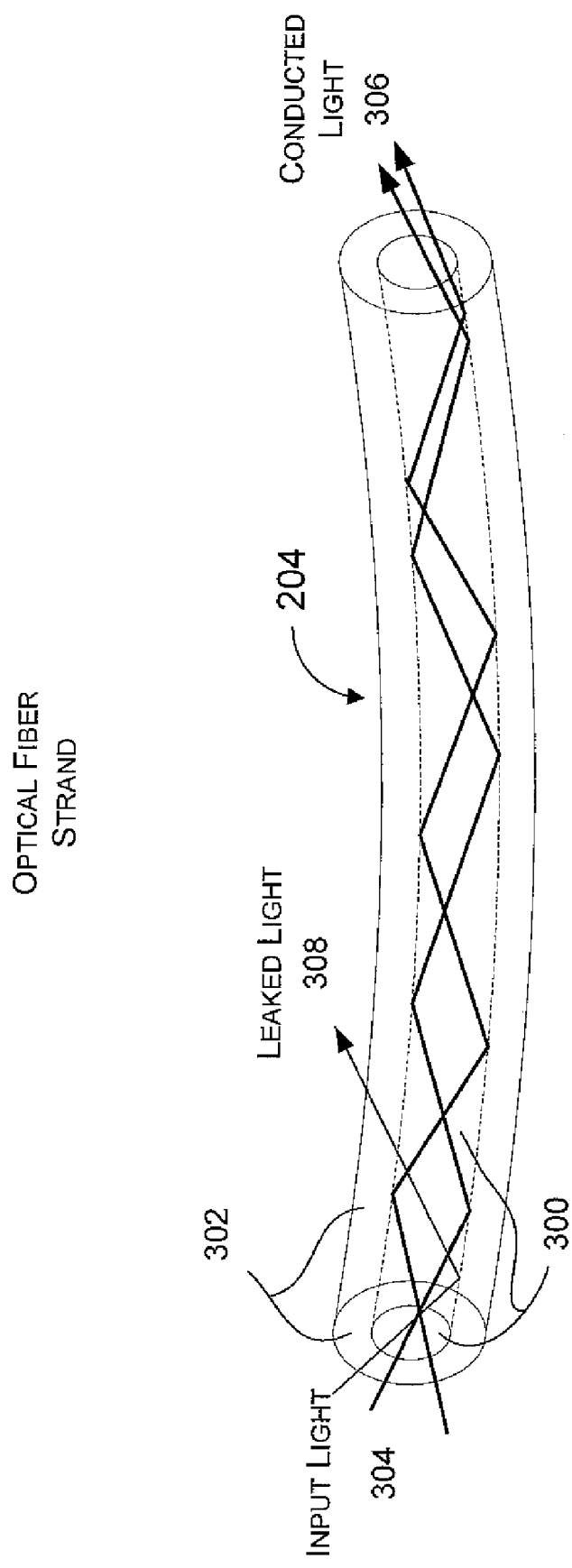
FIG. 3 illustrates an exemplary optical fiber strand embedded in the COA.

FIG. 3 illustrates a side view of an exemplary optical fiber strand 204 that may be incorporated into some embodiments of a COA. Optical fiber strands such as that illustrated in FIG. 3 may be utilized in various implementations to provide counterfeit-resistant and/or tamper-resistant labels. The optical fiber strand 204 may be made of glass, plastics or other suitable material.

Optical fiber strand 204 includes a core portion 300 and a coating layer 302. Coating layer 302 is generally thinner than the core portion 300. Coating layer 302 has a higher refractive index than core portion 300 so that input light rays (304) may be conducted through the optical fiber strand (e.g., at 306) without much light leakage. Occasionally, a light ray may enter the fiber core at such a sharp angle that it may hit the coating layer 302 at an incident angle that is above a critical value. In this case, the light ray leaks out of the optical fiber strand, as illustrated at 308. Generally, the amount of leakage is negligible for most optical fibers.

Figure 4:
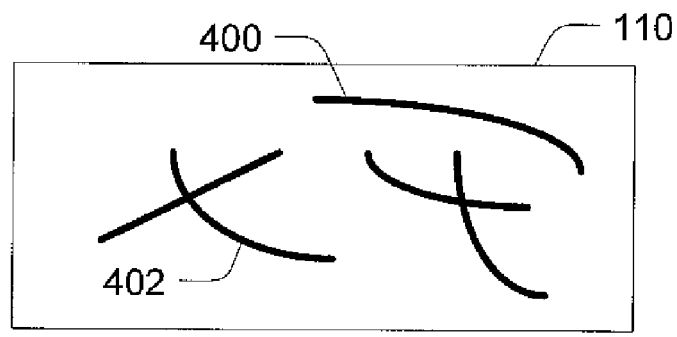
FIG. 4 illustrates an exemplary optical fiber area that forms part of the COA.
Figure 5:
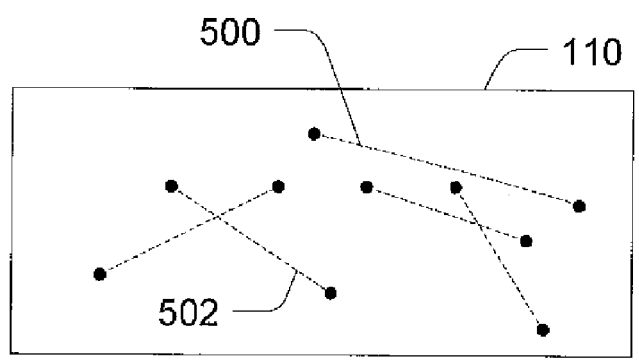
FIG. 5 illustrates an exemplary positional coordinate representation of optical fiber strands in the optical fiber area of the COA.

FIGS. 4 and 5 show an exemplary optical fiber area 110 that may be incorporated into a COA. In FIG. 4, optical fiber area 110 includes optical fiber strands such as optical fiber 400 and optical fiber 402. FIG. 5 shows an exemplary positional coordinate representation of physical optical fiber properties corresponding to optical fiber area 110. In FIG. 5, each optical fiber strand of optical fiber area 110 may be represented by a pair of points (e.g., two ends of the fiber strand) and a dotted line connecting the two points. For example, the fiber optic strands 400 and 402 that are introduced in FIG. 4 are represented by the pairs of points connected by dashed lines 500 and 502, respectively. Thus, an individual optical fiber may be characterized by the points $(x_1^1, y_1^1, x_1^2, y_1^2)$ in a coordinate system. Accordingly, a collection of optical fibers in an exemplary optical fiber area can yield a unique collection of optical fiber endpoint coordinates.

In one implementation, the coordinates of the two ends of each fiber optic strand in an optical fiber area are utilized as randomly occurring features to provide counterfeit and/or tamper resistant COAs. However, it is envisioned that other features of the fiber optic strands may also be utilized such as the strands' curvatures, relative light intensities, fluorescence, colors, thicknesses (e.g., as measured by the width of the strands at each end), and the like. In some embodiments, the two ends of each fiber optic strand may be made visible by illuminating the label to determine the coordinates.

These coordinates constitute the unique property of a medium laden with random optical fibers. If the fibers are embedded randomly in a medium, these coordinates may be utilized as random numbers. Thus, the disclosed optical fiber areas result in COAs that are unique. If a pirate seeks to pass off his or her counterfeited products as genuine, the pirate cannot stop at copying one particular COA. Since the presence of two or more identical COAs would be easily detected via the detection of identical or highly similar collections of optical fiber features in multiple COAs, a pirate must replicate many different COAs in any attempt to spoof the discussed authentication systems.

However, even if a pirate successfully duplicates many different COAs, this duplication would readily be detected if the pirated COAs were scanned. A scan of a pirated COA would reveal that the COA is sufficiently similar to a preexisting COA such that the scanned COA is most likely a pirated copy. That is, data obtained from a COA scan is compared to a database of COAs to determine COA authenticity. If the data obtained from the COA scan indicates inconsistencies associated with the scanned COA, the scanned COA and its associated product may be flagged as suspect. Examples of inconsistencies include product identity (e.g., the COA is associated with the wrong product), product location (e.g., a product with an identical or nearly-identical COA was previously catalogued in a different location), or any other suitable indication that would suggest that the product is not genuine. Thus, even the duplication of multiple COAs would be insufficient to overcome the described authentication methods.

COA Reader Device

Figure 6:
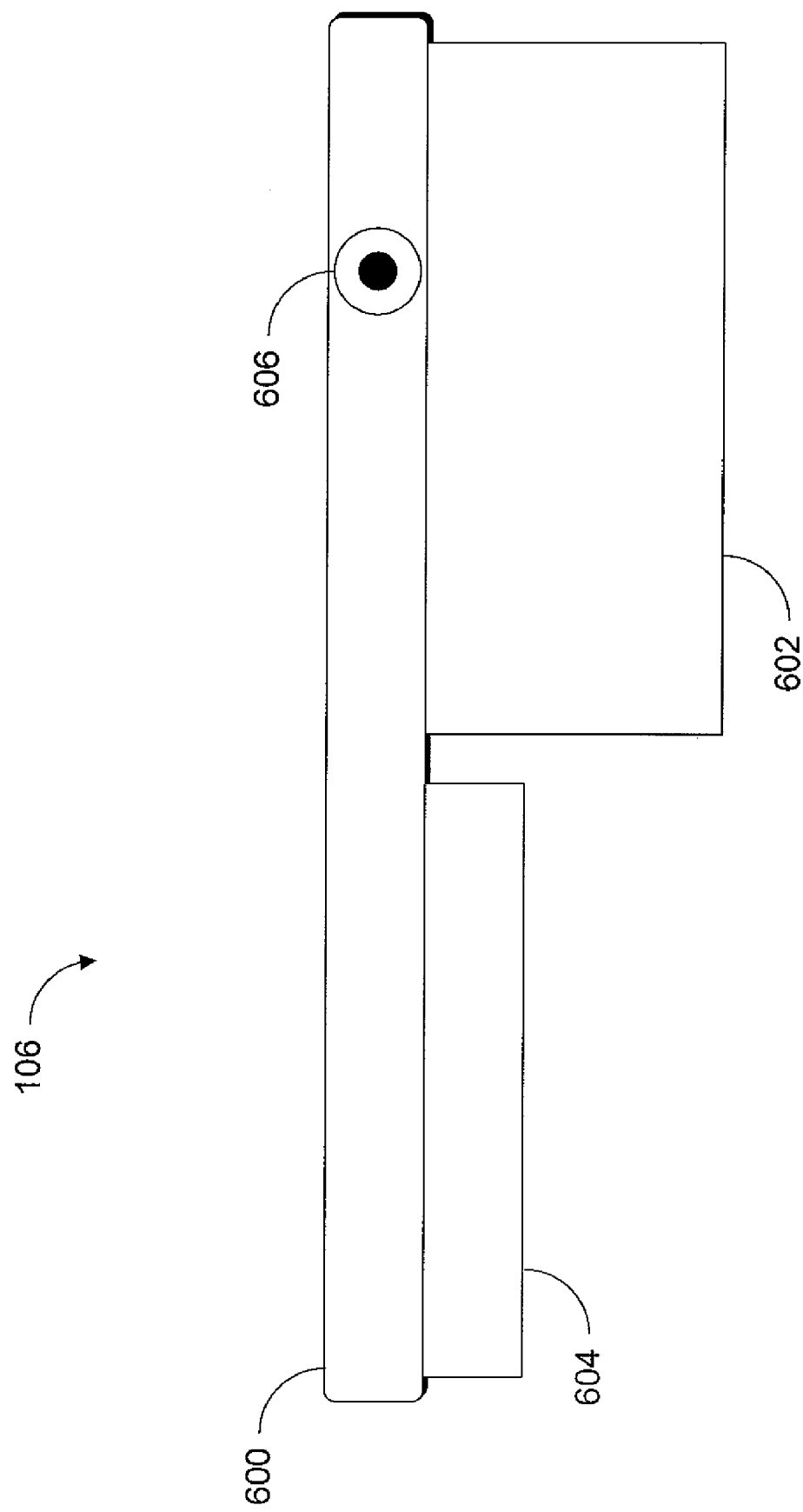
FIG. 6 illustrates a side view of an exemplary COA reader device.

FIG. 6 shows COA reader device 106 (hereinafter "reader device") in more detail. Reader device 106 includes a body 600 that may be formed of a rigid material to provide structural integrity, or of a partially flexible material. Disposed at one end of body 600 is optical fiber reading member 602 and at the other end is barcode reading member 604. Optical fiber reading member 602 and barcode reading member 604 are juxtaposed to read both the optical fibers and the barcode on a COA with a single placement of reader device 106. Fiber reading member 602 projects from body 600 a greater distance than barcode reading member 604 so that fiber reading member 602 can shield the optical fiber area on COA 104 from external light sources when reader device 106 is placed onto COA 104. In some implementations, reader device 106 is placed directly over a COA and activation switch 606 is engaged to initiate optical scanning of both the optical fiber area and the barcode of the COA. It is noted that other mechanisms may also be used to initiate scans, such as sensory detection when fiber reader 602 is placed onto the COA.

Figure 7A:
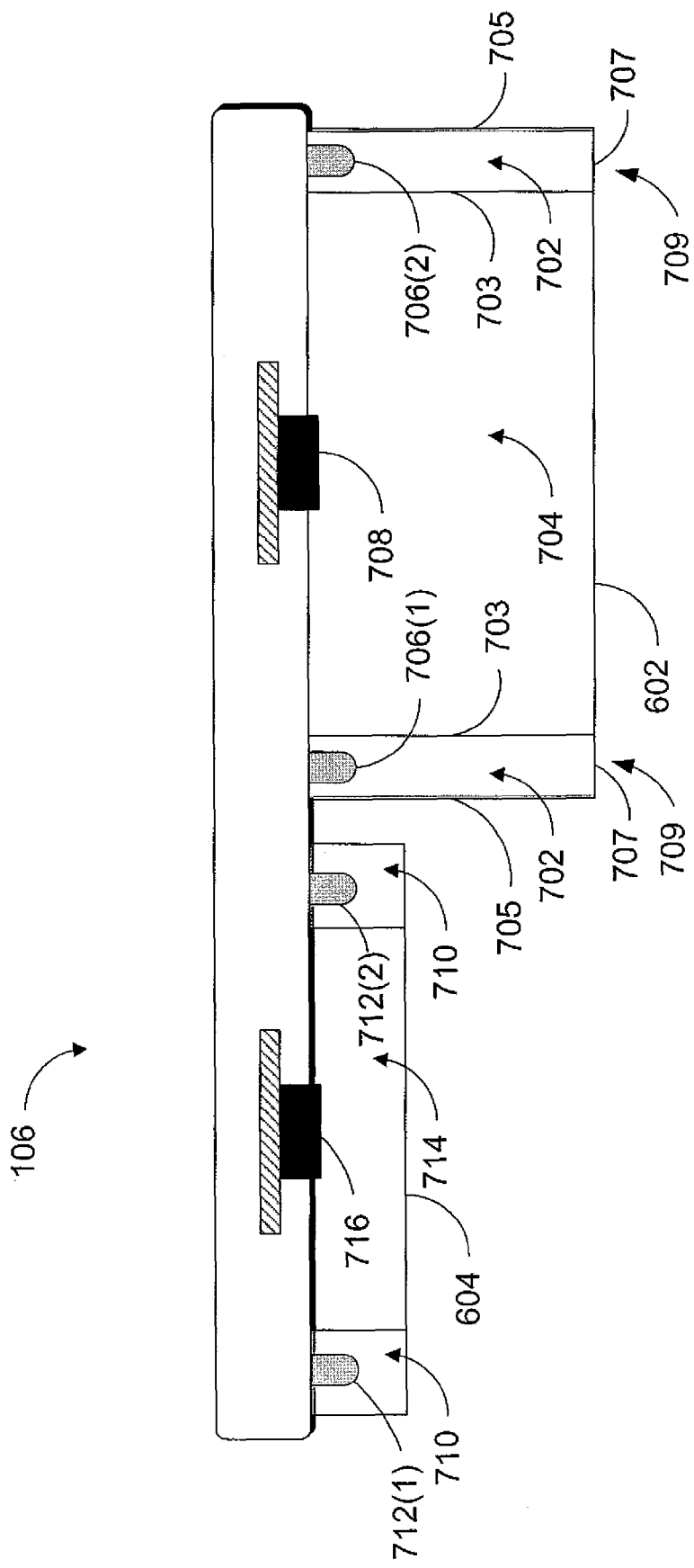
FIG. 7a illustrates a lateral cross-section of an exemplary COA reader device.

FIG. 7a illustrates a lateral cross section of reader device 106. Optical fiber reading member 602 includes optical fiber illumination portion 702, interior wall 703, optical fiber scanning portion 704, exterior wall 705, light sources 706(1) and 706(2), contact face 707 and light detector 708. In some embodiments, optical fiber illumination portion 702 is formed using a suitable light-conducting material such that light from light sources 706(1) and 706(2) is conducted along the interior of optical fiber illumination portion 702. Suitable light-conducting materials include, but are not limited to, transparent or semi-transparent plastics, glass and resins. In other embodiments, the interior of the optical fiber illumination portion is hollow. Also, light sources 706(1) and 706(2) (along with any other light sources discussed herein) may include any suitable light source, such as light-emitting diodes (LEDs), incandescent lights, lasers and the like.

Further to optical fiber reading member 602 is interior wall 703, which is formed by applying a suitable opaque coating along the entire interior perimeter of the optical fiber illumination portion 702. The opaque aspect of interior wall 703 prevents direct light from a light source (e.g., light sources 706(1) and 706(2)) from entering optical fiber scanning portion 704, while also allowing light to be conducted along the interior of the optical fiber illumination portion. Optical fiber reading member 602 also includes exterior wall 705. In some embodiments, exterior wall 705 comprises a light-reflective coating or material that coats the exterior of the optical fiber illumination portion and allows light to be conducted along the interior of optical fiber illumination portion 702. Together, optical fiber illumination portion 702, exterior wall 705 and interior wall 703 form a light baffle 709 that prevents light from being emitted through the exterior and interior walls but allows light to be emitted from contact face 707 of optical fiber illumination portion 702. Thus, in COA scanning environments, light baffle 709 is formed to direct light from a light source onto the optical fibers of a COA and further shield light detector 708 from the light source. Finally, optical fiber reading member 602 includes light detector 708. Suitable light detectors include, but are not limited to, cameras, photodetectors and the like.

FIG. 7a further includes barcode reading member 604 adjacent to optical fiber reading member 602. Barcode reading member 604 includes barcode illumination portion 710, light sources 712(1) and 712(2), barcode scanning portion 714, and data reader 716. Barcode illumination portion 710 is formed using a suitable light-conducting material such that light from light sources 712(1) and 712(2) can be emitted to illuminate a barcode that is situated proximately to the reader device barcode reading area. Suitable light-conducting materials include, but are not limited to, transparent or semi-transparent plastics, glass and resins. Finally, barcode reading member 604 includes data reader 716. Suitable data readers include, but are not limited to, light detectors (e.g., cameras, photodetectors and the like), radio frequency identification (RFID) scanners, smartcard readers and the like. Although not expressly illustrated here, some embodiments of a reader device may include an internal processor, one or more computer-readable memories, audio emission components, and a graphical display.

Figure 7B:
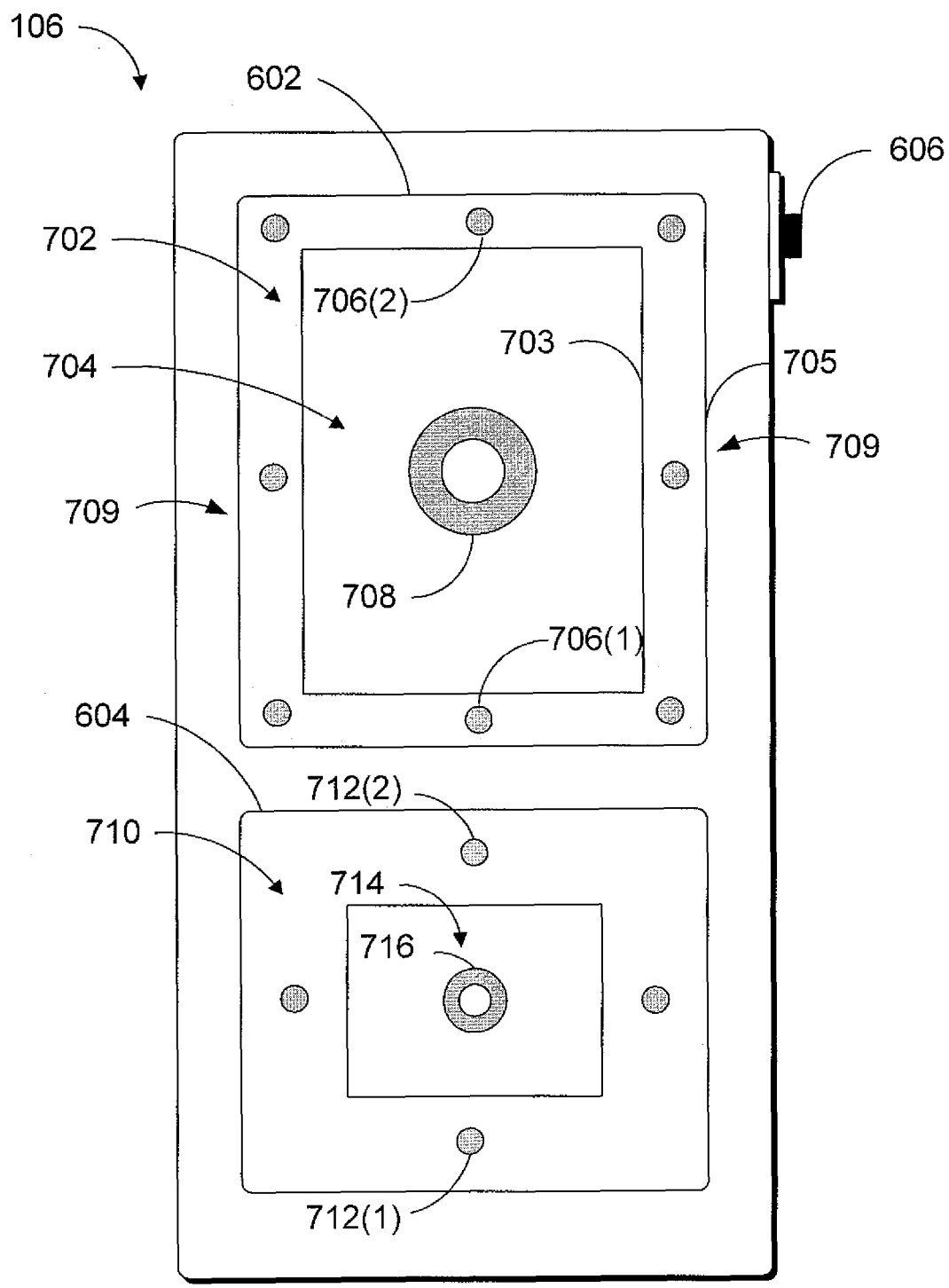
FIG. 7b illustrates a bottom view of a first exemplary implementation of a COA reader device.

FIG. 7b illustrates a bottom view of an exemplary reader device 106. Reader device 106 includes optical fiber reading member 602, barcode reading member 604 and activation switch 606. Optical fiber reading member 602 includes optical fiber illumination portion 702, interior wall 703, optical fiber scanning portion 704, exterior wall 705, light sources 706(1) and 706(2), and light detector 708. Light sources 706(1) and 706(2) are illustrated for purposes of example only, and, as shown in this figure, the optical fiber reading member may include more than two light sources.

FIG. 7b illustrates that exterior wall 705 and interior wall 703 enclose the sides of optical fiber illumination portion 702 and define a closed channel in which optical fiber illumination portion 702 is situated. This closed channel allows light to be conducted from a light source onto the optical fibers of a COA. Further, interior 703 wall defines a central cavity within its perimeter that includes optical fiber scanning portion 704 and in which light detector 708 is disposed. Thus, a cross section of light baffle 709 is formed by the interior wall, the exterior wall and the optical fiber illumination portion and shows outer wall 705 defining a closed perimeter and inner wall 703 defining a closed perimeter, inner wall 703 disposed within outer wall 705, outer wall 705 and inner wall 703 defining a closed channel and inner wall 703 defining a central cavity within the perimeter of inner wall 703.

Optical fiber reading member 602 is shown here as being rectangular in shape. This is not intended to be limiting and any suitable shape or shapes may be utilized. The shape of optical fiber reading member 602 is designed such that it scans the desired optical fiber area of a COA. Thus, in another example, the desired optical fiber area of a COA may be round, and thus a suitable optical fiber reading member may be round. However, the shape of an optical fiber reading member need not exactly match that of a COA optical fiber area in all embodiments.

Further to FIG. 7b is barcode reading member 604, which includes barcode illumination portion 710, light sources 712(1) and 712(2), barcode scanning portion 714 and data reader 716. As illustrated here, the barcode reading member may include more than two light sources. The barcode illumination portion has an interior surface that forms a closed perimeter and defines a central cavity in which data reader 716 is situated.

Reader Device with Light Source Sequencing

The addition of light source sequencing can add dimensionality to the COA authentication process and thus increase the COA duplication burden on potential pirates. For example, a pirate may manage to duplicate one or more COAs by duplicating the light patterns produced during a standard COA scan. However, the pirate will most likely be operating under the assumption that the light source applied to the COA during a scan process will be applied in a uniform manner. Thus, by implementing light source sequencing during COA production and authentication processes, even clever duplications of COAs can be detected.

Figure 7C:
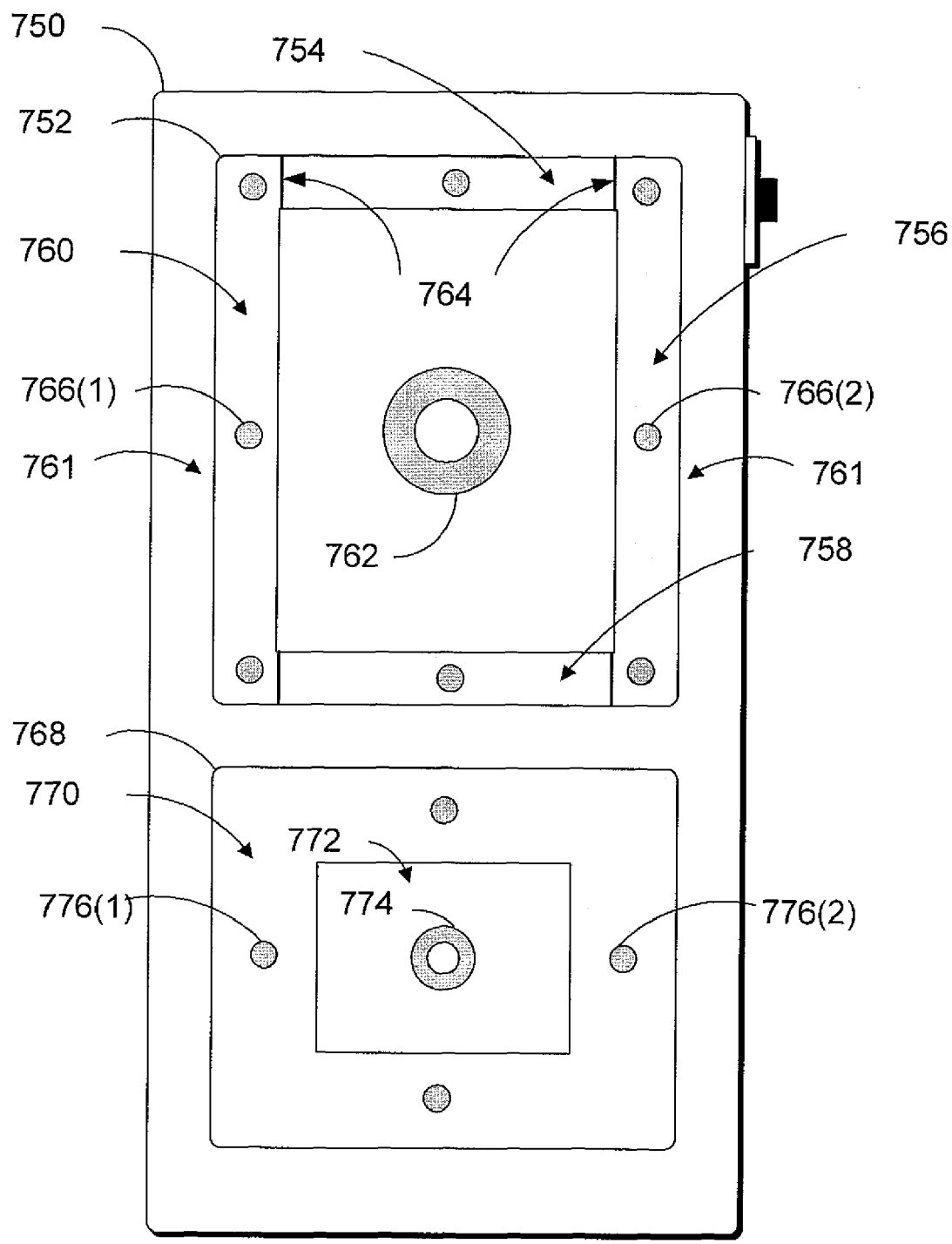
FIG. 7c illustrates a bottom view of a second exemplary implementation of a COA reader device that provides light sequencing functionality.

FIG. 7c illustrates one example of a COA reader device 750 (hereinafter "reader device") that can implement light source sequencing during the COA creation and authentication processes. Reader device 750 includes optical fiber member 752, optical fiber illumination sub-portions 754, 756, 758 and 760 (with interior and exterior walls) that together make up light baffle 761, and light detector 762. Each optical fiber illumination sub-portion is associated with a separate light source (e.g., light source 766(1) in sub-portion 760 and light source 766(2) in sub-portion 756). FIG. 7c further illustrates that the individual optical fiber illumination sub-portions are separated from each other by partitions (e.g., partitions 764). These partitions are opaque in nature and prevent light from leaking from one optical fiber illumination sub-portion into another. Thus, when a light source associated with an individual optical fiber illumination sub-portion is activated, only that optical fiber illumination sub-portion will be illuminated by that light source. While FIG. 7c illustrates a reader device with four optical fiber illumination sub-portions, other embodiments may have any suitable number of similar sub-portions.

Reader 750 also has a barcode reading member 768, which includes barcode illumination portion 770, barcode scanning portion 772, data reader 774, and light sources 776(1) and 776(2). As illustrated here, the barcode reading member may include more than two light sources. The barcode illumination portion has an interior surface that forms a closed perimeter and defines a central cavity in which data reader 774 is situated.

Although not expressly illustrated here, reader device 750 (like reader device 106) may also contain internal computing, communication and data storage components such as a processor, an information store (e.g., a computer-readable memory), an authentication component, a wireless component, and sequencer. The sequencer can activate and deactivate the separate light sources associated with the optical fiber illumination sub-portions of reader device 750. In some embodiments, the sequencer can individually activate and deactivate, in a predetermined sequence, two or more of the light sources associated with optical fiber illumination sub-portions. One example using light sequencing is described below in detail with reference to FIG. 10

COA Scanning

Figure 8:
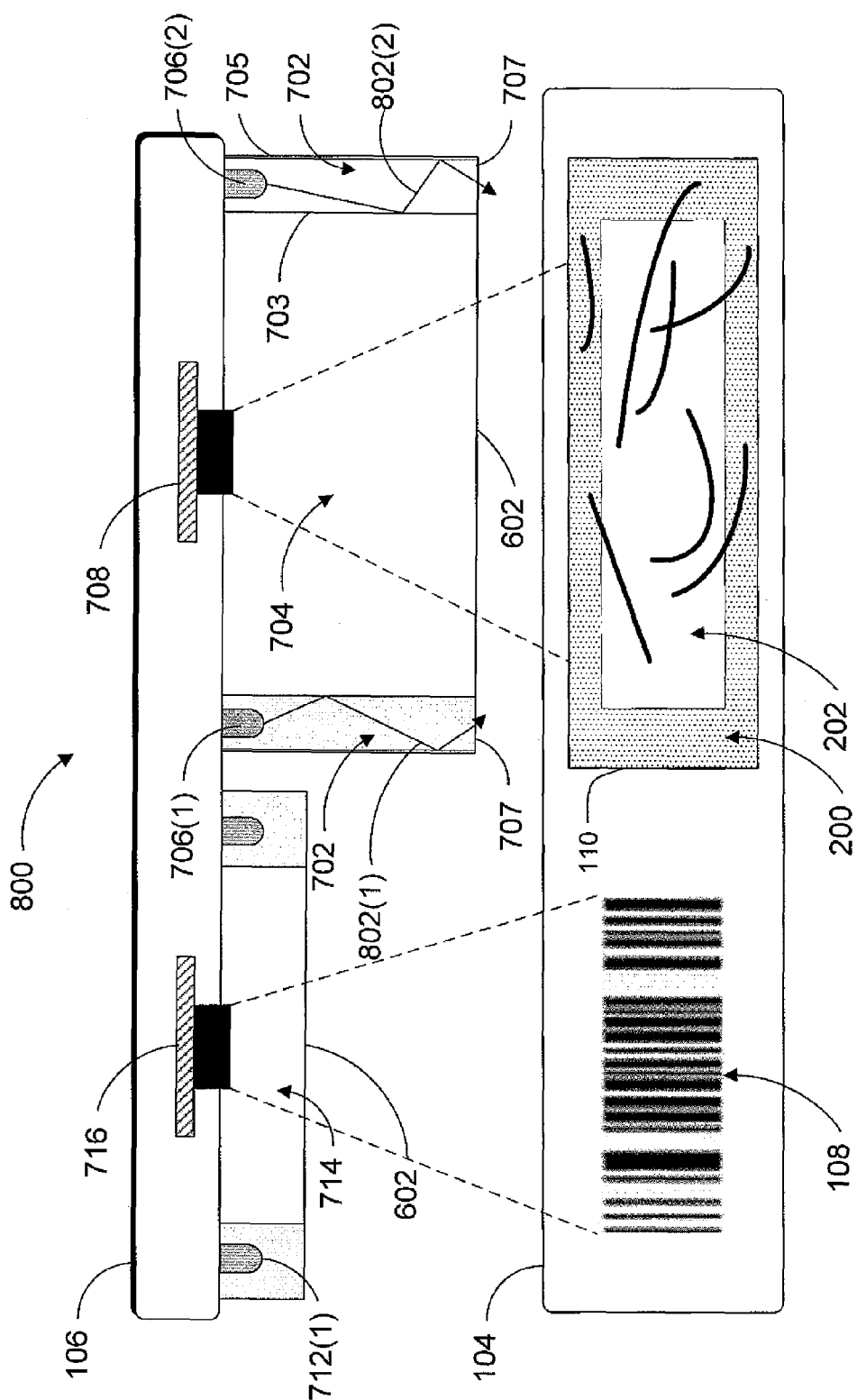
FIG. 8 illustrates a COA reader device reading or scanning a COA.

FIG. 8 illustrates at 800 one example of a COA scan where reader device 106 is placed on and scans COA 104. Reader device 106 is positioned onto COA 104 such that optical fiber reading member 602 is in direct contact with the surface of COA 104. Also, the position of reader device 106 is adjusted such that contact face 707 is aligned with COA illumination area 200. A user then activates the reader device's scan function (e.g., by engaging the activation switch illustrated in FIG. 7b). The activation of the reader device's scan function then initiates a specific subset of reader device operations. In one operation, light sources 706(1) and 706(2) are illuminated to generate light rays 802(1) and 802(2), which are conducted through optical fiber illumination portion 702 and emitted at contact face 707. Interior wall 703 and exterior wall 705 of optical fiber illumination portion 702 are coated such that light from light sources 706(1) and 706(2) is not emitted from the interior and exterior walls. Thus, light is emitted from optical fiber illumination portion 702 at contact face 707. As a result, when the reader device is position as explained above, COA illumination area 200 is illuminated and COA fiber scanning area 202 is shielded from direct light. The consequences of this arrangement are discussed in more detail below with reference to FIG. 9.

During the COA scan, light detector 708 is also activated. The optical fibers associated with optical fiber area 110 of COA 104 can display certain behaviors in response to incident light. Fibers in COA illumination region 200 are illuminated with light from optical fiber illumination portion 702, and this causes some or all of the fibers or portions of fibers within COA fiber scanning region 202 to emit light. Accordingly, if any of the fibers in COA fiber scanning region 202 emit light into optical fiber scanning portion 704, light detector 708 can capture this emission as a distinct light pattern by scanning COA fiber scanning region 202. Although not specifically illustrated here, this distinct light pattern can be processed either internally or externally of the reader device to authenticate the COA. This emission of light by optical fibers can produce a random or pseudo-random arrangement of light points or patterns that can be processed to produce data points that uniquely identify a COA and its associated product.

The activation of a reader device's scan function can also cause any light sources associated with barcode reading member 602 (e.g. light source 712(1)) to be activated and thus illuminate barcode 108. Data reader 716 can be activated and thus detect any light emitted and/or reflected into barcode scanning portion 714 by barcode 108. The light detected from the barcode is used to extract information from the barcode for use in the COA authentication or verification process. Although not expressly illustrated here, some embodiments of a reader device include an onboard and/or internal cryptography component. Thus, in some embodiments, data obtained from barcode 108 is decrypted using the onboard cryptography component. The decrypted barcode data is then compared to information obtained from optical fiber area 110 to determine if the decrypted barcode data correlates with the optical fiber information. If the decrypted barcode data fails to correlate with the optical fiber information, the COA may be flagged as suspect.

Figure 9:
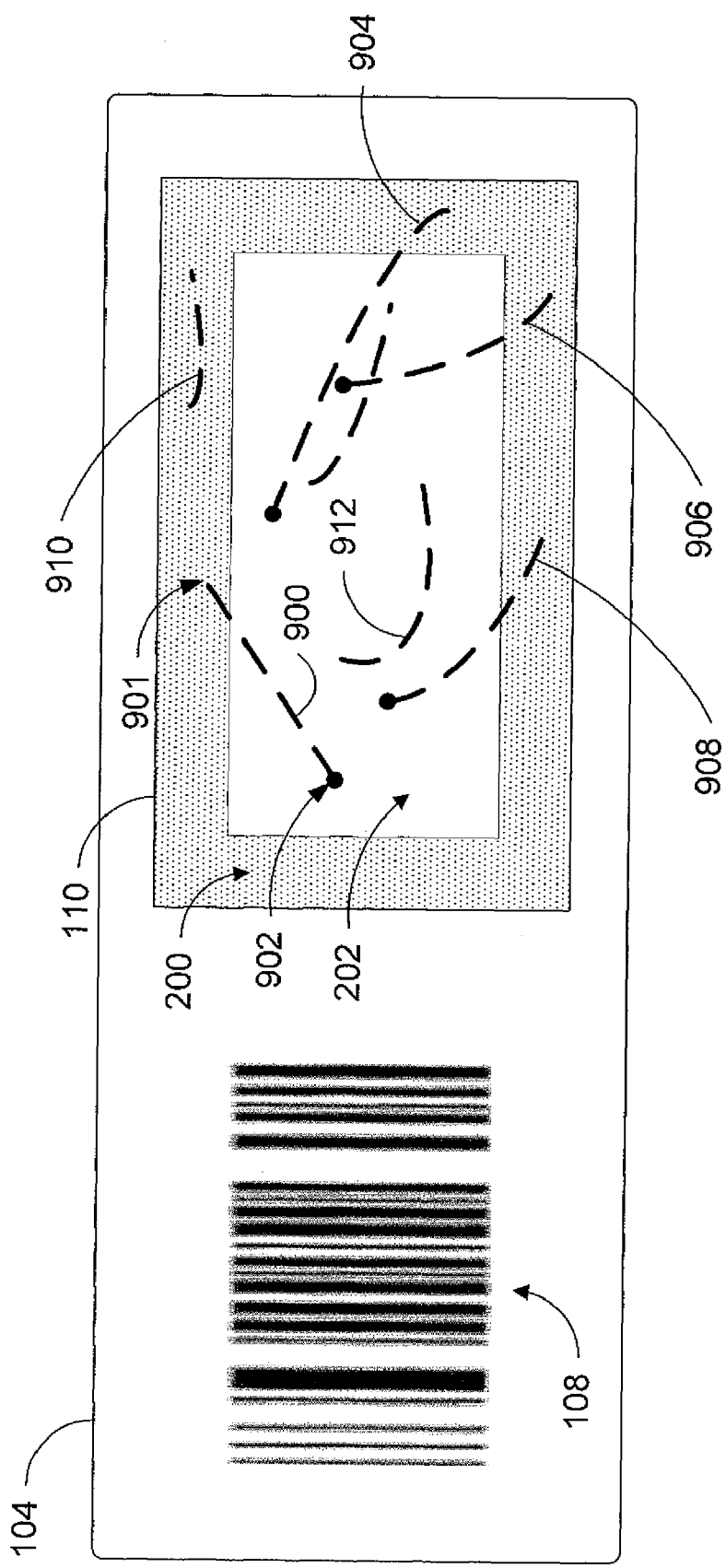
FIG. 9 illustrates a COA and an exemplary light pattern produced during a scan by the COA reader device.

FIG. 9 illustrates one example of a light pattern produced by a COA scan. Among the features illustrated in FIG. 9 are exemplary COA 104, barcode 108, COA optical fiber area 110 (with embedded fibers), COA illumination region 200, and COA fiber scanning region 202. As mentioned above with respect to the COA optical fiber area, during a COA scan, only the COA illumination region is illuminated with direct light from a reader device. Further, the COA fiber scanning region is shielded from direct light from the reader device.

The fibers illustrated in FIG. 9 fall into three general categories. The first category describes those fibers whose ends exist only in the COA illumination region (e.g. optical fiber 910). The second category describes those fibers whose ends exist in both the COA illumination region and the COA fiber scanning region (e.g. optical fibers 900, 904, 906 and 908). Finally, the third category describes those fibers whose ends exist only in the COA fiber scanning region (e.g. optical fiber 912). These categories are presented for purposes of discussion only, and other COA optical fiber areas may have other arrangements and types of fibers.

As to the fibers in the first category, these fibers will not be detected in most COA scans since the COA illumination region is shielded from the light detector of a reader device when the reader device is in contact with the COA. Thus, as illustrated in FIG. 9, optical fiber 910 displays no optical activity that is detectable by the light detector. As to the fibers in the second category, these fibers will most often result in detectable optical activity. When a fiber such as optical fiber 900 has one of its ends in the COA illumination region, this end is susceptible to incoming light from a reader device's optical fiber illumination region. As discussed above with respect to FIGS. 3-5, an optical fiber is capable of conducting light through its core. Thus, an optical fiber such as optical fiber 900 can receive light from a light source at fiber end 901 and emit light from fiber end 902. As shown in this illustration, fiber end 902 displays optically detectable activity as illustrated by the dot at the fiber end. A similar situation applies with respect to optical fibers 904, 906 and 908.

Finally, the fibers in the third category (e.g., optical fiber 912) will most often not display any optically detectable activity since they are situated in a region that is shielded from a light source. Certain exceptions may occur if there is light leakage from surrounding optical fibers that is incident upon these fibers. Thus, as shown in FIG. 9, those fibers that display optically detectable activity during a COA scan contribute to the unique signature associated with each individual COA.

Figure 10:
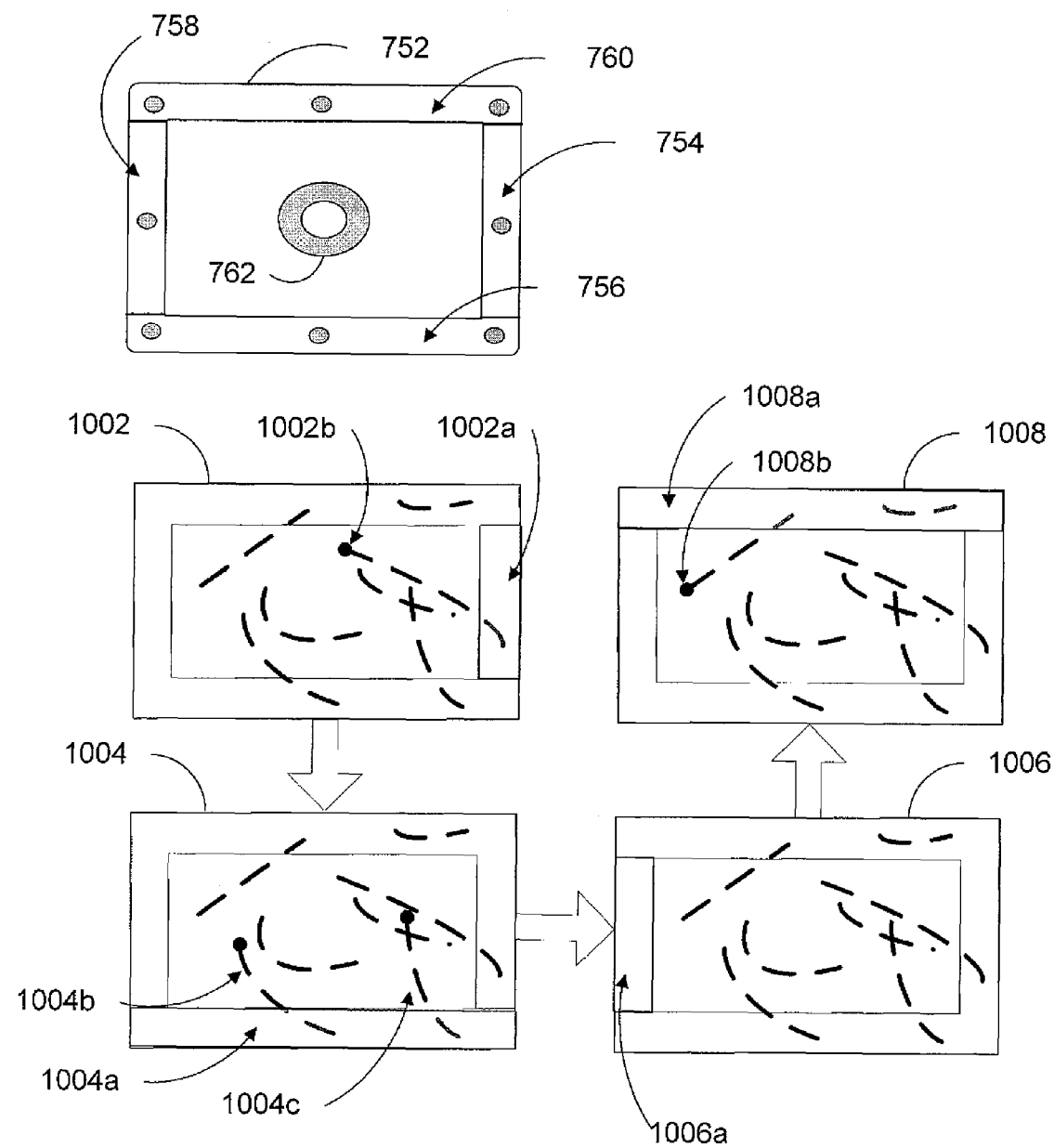
FIG. 10 illustrates an exemplary certificate of authenticity scan using a light sequencing embodiment.

FIG. 10 illustrates one implementation of a COA scan using a light source sequencing embodiment. FIG. 10 includes optical fiber reading member 752, optical fiber illumination sub-portions 754, 756, 758 and 760, and light detector 762. As discussed above with respect to FIG. 7c, the optical fiber illumination sub-portions are separated by opaque partitions that prevent light from leaking from one optical fiber illumination sub-portion into another. The light sequence illustrated here is for purposes of example only, and any suitable sequence of light source activation and deactivation may be employed. As illustrated below, an optical fiber illumination region associated with a COA may have a plurality of sub-regions that may be illuminated by optical fiber illumination sub-portions of a reader device.

At 1002, a first COA fiber area scan is taken by activating a light source associated with optical fiber illumination sub-portion 754 which, when the reader device is placed on the COA as discussed with respect to FIG. 8, results in illuminating COA illumination sub-region 1002a. As discussed above, this may result in optically detectable activity from appropriately situated optical fibers. In this example, only optical fiber 1002b displays optically detectable activity. Light detector 762 then scans the COA fiber scanning region and the light source associated with optical fiber illumination sub-portion 754 is deactivated.

At 1004, a second COA fiber area scan is taken by activating a light source associated with optical fiber illumination sub-portion 756 which, when the reader device is placed on the COA, results in illuminating COA illumination sub-region 1004a. As discussed above, this may result in optically detectable activity from appropriately situated optical fibers. In this example, two optical fibers display optically detectable activity (e.g. optical fibers 1004b and 1004c). Light detector 762 then scans the COA fiber scanning region and the light source associated with optical fiber illumination sub-portion 756 is deactivated.

At 1006, a third COA fiber area scan is taken by activating a light source associated with optical fiber illumination sub-portion 758 which, when the reader device is placed on the COA, results in illuminating COA illumination sub-region 1006a. In this example, there are no optical fibers with their ends situated in COA illumination sub-region 1006*a*, so there is no optically detectable activity. Light detector 762 then scans the COA fiber scanning region and the light source associated with optical fiber illumination sub-portion 758 is deactivated.

Finally, at 1008, a fourth COA fiber area scan is taken by activating a light source associated with optical fiber illumination sub-portion 760 which, when the reader device is placed on the COA, results in illuminating COA illumination sub-region 1008*a*. In this example, only optical fiber 1008*b* displays optically detectable activity. Light detector 762 then scans the COA fiber scanning region and the light source associated with optical fiber illumination sub-portion 760 is deactivated. Thus, as shown, light sequencing can be used to illuminate one or more COA illumination sub-regions in a specific sequence of individual illuminations.

Although not expressly illustrated in FIG. 10, there may also be a barcode or other data storage component associated with the COA. Thus, the barcode reading member associated with the reader device (as illustrated in FIG. 7*c*) can operate to read the barcode or other data to further aid in authentication of the COA.

This sequencing pattern occurs when a COA light pattern or imprint is first entered into a COA database, and thus the light sequencing pattern is paired with the COA. Information about the sequencing pattern can also be encrypted and included in the barcode data to be retrieved later (e.g., during a COA scan). If it is later desirable to authenticate a product associated with the COA, the sequencing pattern is applied during the authentication process. If the same pattern of optically detectable activity is not encountered during the authentication process, then the product associated with the COA may be flagged as suspect. As is evident from the discussion of FIG. 10, by sequencing the light sources associated with a reader device, the dimensionality of the random optical fiber pattern can be increased. If a pirate wishes to duplicate the COA, the duplicated COA must produce identical or sufficiently similar light patterns when the same sequence of light is applied to the COA.

Exemplary Processes

Figure 11:
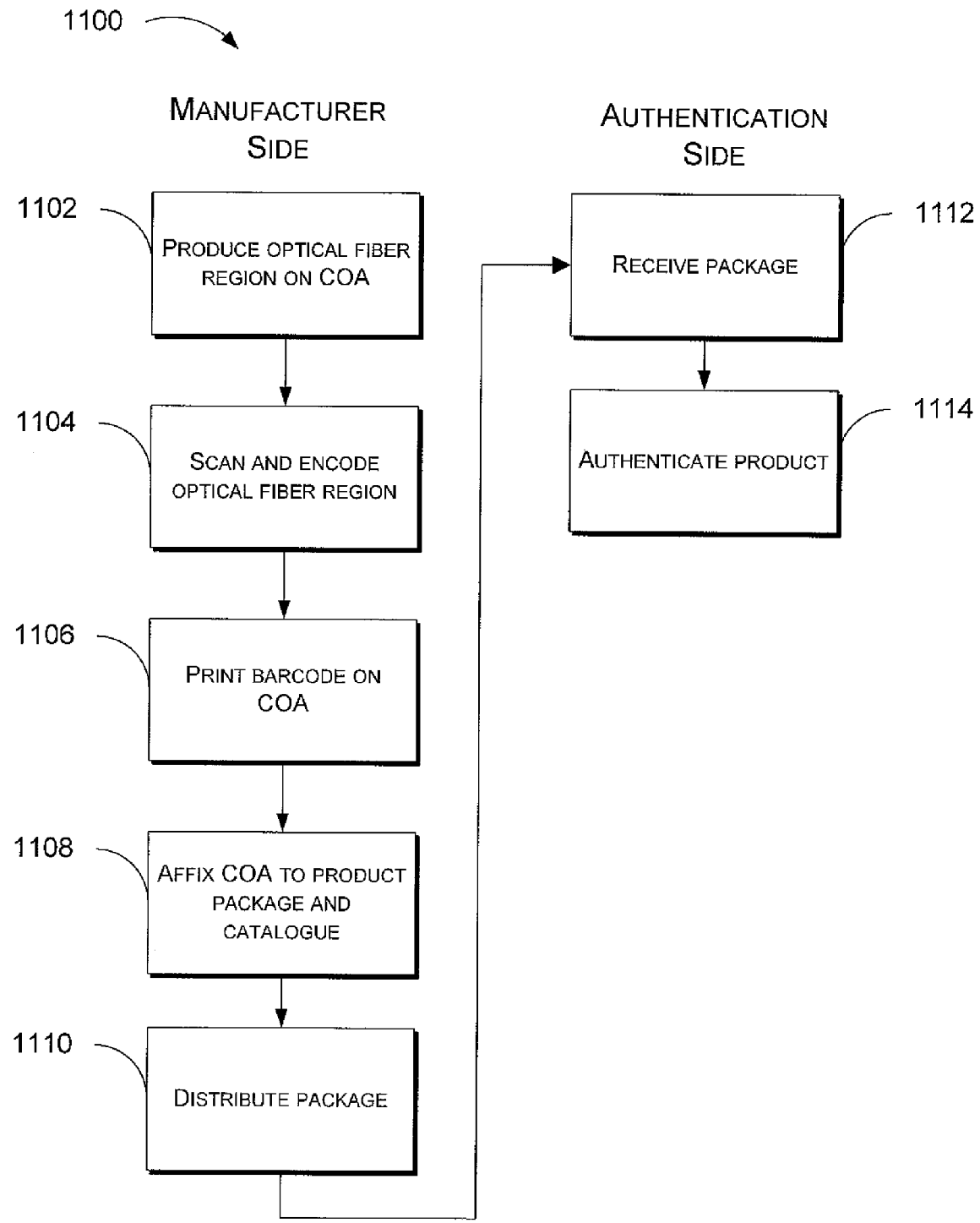
FIG. 11 is a flow diagram of an exemplary process for creating and authenticating a certificate of authenticity.

FIG. 11 shows at 1100 an exemplary process for COA creation and authentication. The process can be implemented in connection with any suitable hardware, software, firmware or combination thereof. FIG. 1 presents one example of an architecture that can implement the process. The described process is divided into acts that are performed on the manufacturer side, and acts that are performed on the authentication side.

At 1102, an optical fiber area is produced on a COA. Methods of producing COA optical fiber areas are discussed above. At 1104, the optical fiber area is scanned for optically detectable activity, and any such activity is encoded as information about the COA. This may include determining the coordinates of one or more light points or patterns on the optical fiber area and assembling these coordinates into a set of data points that represent the COA. At 1106, a barcode is produced and printed on the COA. Production of the barcode includes encrypting the encoded information produced at 1104 using any suitable encryption protocol. In some embodiments, encrypting the encoded information may require a private key that may only be available to certain entities, such as a product or packaging manufacturer. Thus, without access to the private key, a pirate cannot access the information encoded in the barcode and thus reproduce the barcode. As such, the barcode presents a cryptographically strong representation of the optical activity of the associated COA optical fiber area. The barcode may also include other information about a product in addition to the COA information (e.g. product identity, destination, manufacture date, etc.).

At 1108, the COA is affixed to a product package and the COA identity is paired with the product identity. Thus, the COA/product pair is catalogued in a database of COAs so that the product may later be authenticated based on the information contained in the COA. The database of COAs may be stored in an information store resident on a COA reader device and/or on a remote resource such as a server or network. At 1110 the product with the affixed COA is distributed to a wholesaler, retailer, or some other suitable destination or entity.

At 1112 the product is received at some intermediary or final destination. At 1114 the product is authenticated. In certain instances it may be desirable to authenticate the product while in transit or at a particular destination. For example, a particular product may be temporarily stored in the hold of a ship while the ship is in port. Utilizing the devices and methods discussed herein, an agent (such as a licensee or a customs agent) can scan the COA associated with the product to verify its identity.

Product authentication may be done utilizing a reader device with onboard memory and processing capabilities (e.g., reader device 106). Such a device can scan the COA, process the resulting raw physical COA data to produce some type of encoded data (e.g., light point coordinate data), and compare the encoded data with an internal store of authentic COA information or data. As discussed above, the barcode on the COA can be scanned, and information obtained from the barcode scan can be decrypted. The decrypted barcode information can then be compared to the data obtained from the optical fiber area of the COA to determine if the two sets of information correlate. If the decrypted barcode information fails to correlate with the optical fiber area information, the COA can be designated as potentially being a pirated copy.

If the reader device determines that the barcode information correlates with the optical fiber area information, the reader device can then compare the COA information with a database or other store of COA data. If the reader device then determines that the scanned COA exists in its COA data store and that the COA information matches the accompanying product (e.g., the product type, location, etc.), the reader device can signal that the product is authentic by some graphical or audible means. Otherwise, if the reader device determines that the COA does not exist in its COA data store or that the COA is a duplicate of another COA, the reader device can flag the product as suspect and the agent can initiate further investigation into the authenticity of the scanned product.

Other embodiments may utilize a remote entity such as a server or network that may be communicatively coupled to a reader device. The remote entity may house a COA information or data store and have the processing capabilities to authenticate a COA. Thus, a COA scanner device may scan a COA and transfer raw or partially processed COA data to the remote entity via a wired or wireless connection. This transfer may be immediate, or it may occur at a later time if the reader device is not currently connected to the remote entity. The remote entity can then process the COA data and determine if the COA is authentic or suspect.

Figure 12:
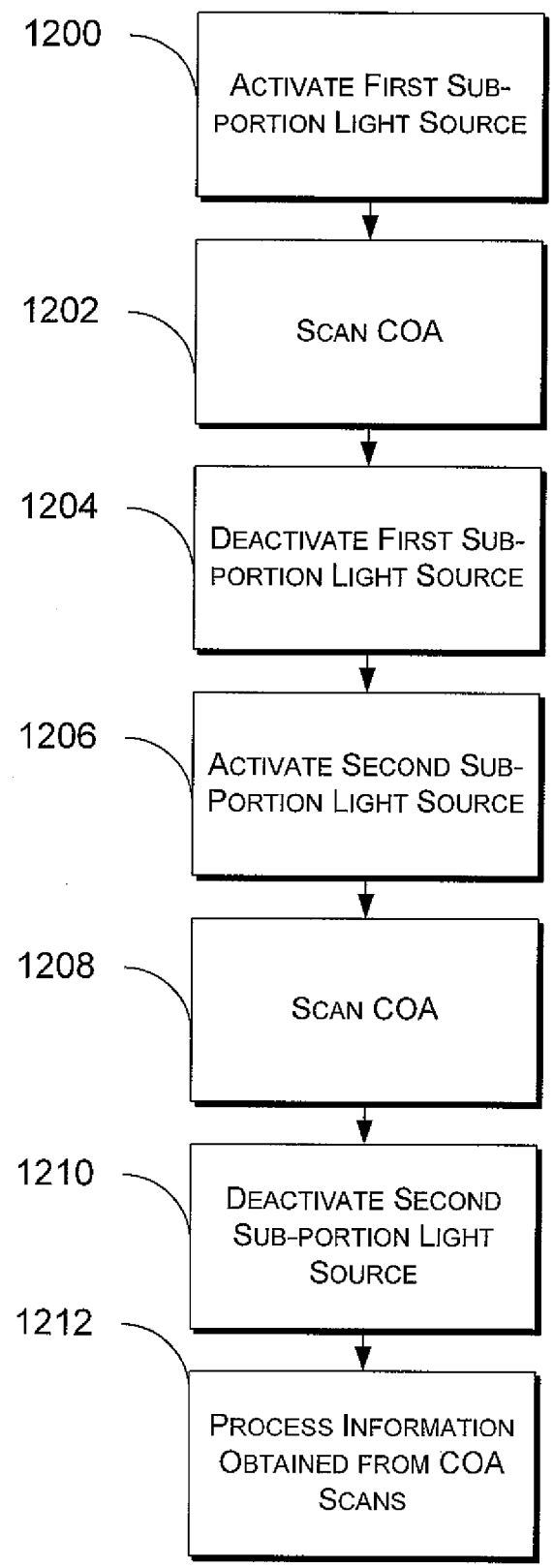
FIG. 12 is a flow diagram of an exemplary process that utilizes a light sequencing embodiment.

FIG. 12 is a flow diagram in accordance with one embodiment of a COA creation and authentication method that utilizes light sequencing. The method can be implemented in connection with any suitable hardware, software, firmware or combination thereof. FIG. 1 constitutes but one example of a system that can implement the following method. This method may utilize a reader device as illustrated in FIG. 7*c*.

At 1200, a light source associated with a first optical fiber illumination sub-portion is activated. At 1202, an optical scan of the COA optical fiber area is taken. At 1204, the light source associated with the first optical fiber illumination sub-portion is deactivated. At 1206, a light source associated with a second optical fiber illumination sub-portion is activated. At 1208, an optical scan of the COA optical fiber area is taken. At 1210, the light source associated with the second optical fiber sub-portion is deactivated. At 1212, the information obtained from the respective COA optical fiber area scans is processed. The processing takes into account the sequence with which the above-mentioned light sources were activated and deactivated. The resulting information can be encrypted and included in a barcode that is printed on the COA. This method can be implemented when the COA is first entered into a COA database, and can later be implemented when one or more entities wish to authenticate the COA. While this exemplary method shows only two activation/scan/deactivation cycles, any suitable number and arrangement of cycles may be implemented.

CONCLUSION

Various embodiments describe techniques for authenticating certificates of authenticity (COAs). The techniques provide for a simplified authentication system that is easily utilized in a field setting. More specifically, in one embodiment a device optically scans COAs that are attached to or otherwise associated with goods for the purpose of authenticating that the associated goods are genuine (i.e., not pirated). Still further, authentication methods are discussed that may implement such devices.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An apparatus for reading a certificate of authenticity, the certificate of authenticity having one or more optical fibers, the apparatus comprising:
    a body;
    a light detector;
    a light baffle attached to the body that conducts light from a light source onto the one or more optical fibers of the certificate of authenticity, the light baffle comprising an outer surface and an opaque inner surface that defines a central cavity that surrounds the light detector and shields the light detector from the light source; and
    a data reader adjacent to the light baffle.

2. The apparatus of claim 1, wherein the light detector is to detect light emitted from the one or more optical fibers.

3. The apparatus of claim 1, wherein the light baffle includes a transparent or semi-transparent light-conducting channel portion that encloses the light source.

4. The apparatus of claim 3, wherein the light detector is located within an optical fiber scanning portion of the apparatus, and wherein the light baffle further shields the optical fiber scanning portion of the apparatus from direct light from the light source.

5. The apparatus of claim 3, wherein the light detector is to detect light within the central cavity.

6. The apparatus of claim 1, wherein the light baffle comprises a plurality of sub-portions, each sub-portion being associated with a corresponding light source and formed to shield other sub-portions from the corresponding light source.

7. The apparatus of claim 6, further comprising a sequencer to activate and deactivate in a sequence the light sources associated with each of one or more of the sub-portions.

8. The apparatus of claim 6, further comprising a sequencer to individually activate two or more of the light sources associated with the sub-portions in a predetermined sequence.

9. The apparatus of claim 1, wherein the data reader is to read a barcode.

10. The apparatus of claim 1, further comprising:
    an internal computer-readable memory to store data associated with the certificate of authenticity; and
    an internal cryptography component to decrypt data associated with the certificate of authenticity.

11. A method comprising:
    scanning, with a first member of a reader device, a first portion of a certificate of authenticity to obtain light pattern information from optical fibers embedded in the first portion, each of the optical fibers to receive light at a first fiber end, conduct the light along a core of the optical fiber, and to emit the light at a second fiber end;
    scanning, with a second member of the reader device, a second portion of the certificate of authenticity, the second portion including information about the first portion;
    authenticating the certificate of authenticity based on information obtained from scanning the first and second portions.

12. The method of claim 11, wherein scanning the first portion of the certificate of authenticity includes activating and deactivating, in a specific sequence, a plurality of light sources associated with the first member of the reading device.

13. The method of claim 12, wherein the first portion of the certificate of authenticity includes a plurality of sub-regions, and wherein scanning the first portion of the certificate of authenticity includes illuminating one or more of the sub-regions in a specific sequence of individual illuminations.

14. The method of claim 13, wherein at least one illumination in the specific sequence of illuminations includes illuminating less than all of the sub-regions.

15. The method of claim 11, wherein the information included in the second portion includes information about physical properties of the optical fibers.

16. A system for authenticating a certificate of authenticity, the system comprising:
    an information store to store information about a plurality of certificates of authenticity;
    a reading device to read certificates of authenticity, the reading device comprising:
        a light detector to detect light conducted by light conducting elements on a certificate of authenticity;
        a data reader adjacent the light detector to read data related to each certificate of authenticity;
        a light-conducting portion that encloses a light source and conducts light from the light source to the light conducting elements on the certificate of authenticity; and
    an authentication component to receive, from the reading device, data associated with the certificates of authenticity and to authenticate the certificates of authenticity based at least in part on information received from the information store.

17. The system of claim 16, wherein the information store and the authentication component reside on the reading device.

18. The system of claim 16, wherein at least one of the information or the authentication component store resides remotely from the device.

19. The system of claim 16, wherein the reading device further comprises a wireless transmitter and a wireless receiver.

20. The system of claim 16, wherein the data reader is to read a barcode that contains data related to a light pattern formed by the light conducting elements in response to exposure to the light from the light source.

* * * * *